Patented Apr. 15, 1947

2,419,060

UNITED STATES PATENT OFFICE 2,419,060

METHOD FOR MAKING COLLOIDAL DISPERSIONS OF A RUBBERLIKE REACTION PRODUCT OF AN INORGANIC POLYSULFIDE AND AN OLEFIN DIHALIDE

John Edwardes, Detroit, Mich., assignor to Clare L. Brackett, Detroit, Mich.

No Drawing. Application October 31, 1942, Serial No. 464,142

5 Claims. (Cl. 260—6)

This invention relates to the art of colloidal dispersions. More particularly, it pertains to the obtention of stable aqueous dispersions, including details as to regulation of their particular characteristics. In one primary adaptation, the invention is concerned with dispersions of the rubber latex type, and more especially that of elastomer aqueous dispersions.

It is generally conceded that the characteristics of a dispersion materially affect the properties of an ultimate product derived therefrom; of especial significance in this connection are the stability and particle size of the disperse phase. Thus, an industries concerned with the manufacture of sprayed and dipped goods of the rubber type, of which surgeons' gloves comprise but one illustration, these properties are of vital importance in view of their effect upon the covering qualities, uniformity, etc., of the coating applied from a dispersion.

In view of the desirability as well as necessity of utilizing synthetic rubber latices in lieu of the natural material, there has been coisiderable stimulus given to research as well as industrial application bearing upon the improvement of natural latex and the utilization of elastomer dispersons in its stead. Many problems have presented themselves in this connection, as a result of substantial differences in the physical as well as chemical properties existing as between the synthetic materials themselves, and in comparison with the natural rubber latex, the intent generally being to simulate the properties of the latter. Merely by way of illustration, many of these more recent synthetic rubber materials developed manifest a substantially high specific gravity in comparison with that of natural latex, and considerable difficulty has been encountered in obtaining stable dispersions of such materials.

It is an object of this invention to obviate such difficulties and uncertainties as hereinabove referred to.

An additional object is to obtain improved dispersions of elastomers and analogous material.

Another object is to provide aqueous dispersions of elastomers and analogous materials of enhanced stability and generally improved properties.

A further object of the invention is to attain dispersions of elastomers or natural rubber latex wherein the particle size of the disperse phase is substantially reduced in comparison with that which normally prevails for the given material.

An important object of the invention is to obtain stable aqueous dispersions of elastomers from elastomer flocculates.

Other objects, advantages, and features of the invention will become apparent from the following description which is to be treated as illustrative and not limitative.

The principle of the invention may be best illustrated by a description in terms of a preferred embodiment thereof, exemplified by Thiokol. This material comprises a rubber-like organic alkaline polysulfide reaction product which may be obtained by the reaction of a water soluble inorganic polysulfide such as sodium polysulfide with organic compounds having replaceable negative groups illustrated by ethylene dichloride, or by the action of molten sulphur on olefin hydrocarbons. Notwithstanding the similarity of these materials to rubber in many respects, they are notably distinguished from the natural material by their inertness toward liquids which have a substantial effect upon rubber. By way of illustration, Thiokols are comparatively insoluble in mineral oils and other organic liquids which affect rubber. The principle of the invention may be similarly applicable to natural latices, such as rubber latex, and to other synthetic rubber-like materials illustrated by polyvinyl derivatives of which polyvinyl chloride polyvinyl acetate, and the conjoint polymer of these substances are examples.

Procedures involved in the production of Thiokols usually result in the obtention of a comparatively dilute solution containing the particles in the form of individual clusters which will not remain in suspension. In this connection, it should be noted that the specific gravity of these particles is in excess of one, whereas the specific gravity of natural rubber latex is less than one. As a result of the failure of the Thiokol particles to remain in suspension, a comparatively heavy flocculate is formed manifesting the characteristics of a precipitate or paste. This sedimentation of particles affords the possibility of removing by decantation dissolved salts in the liquid resulting from the reaction directed to the production of the rubber-like polysulfide. However, it renders the material impossible of usage for coating compositions applied by the dipping or spray method, as above considered.

It has been ascertained within the purview of the present invention that such precipitated flocculates of a Thiokol may, by appropriate treatment, be converted into a very desirable aqueous dispersion manifesting the desirable attributes of substantial stability as well as reduced particle size, as compared with that of the material when originally formed. This is accomplished by a weakening of the bond between the respective particles through the treatment of the flocculate with appropriate reagents, and the application of suitable mechanical forces in the presence of such reagents.

The fundamental of procedure involved may be characterized as analogous to the wetting of a segment or portion of paper in order to greatly facilitate its division into a plurality of smaller segments or portions. Illustrative of a preferred procedural embodiment, the following example is presented.

A Thiokol precipitate or flocculate in the amount of approximately 360 grams, which may comprise 60% Thiokol and 40% water, is intimately admixed with approximately 320 grams of a 15% alkaline casein solution. A wetting agent, desirably in the proportion of approximately 18 grams, is added to the casein-flocculate mixture. Particularly desirable as a wetting agent has been found to be that known as Santomerse, which is an alkylated aryl sulphonate; it is, however, not intended to be restricted to the use of any particular wetting agent, in view of the fact that many can be effectively utilized, including Aerosol OS (an alkyl aryl sulphonate); Aresklene (dibutyl phenyl phenol sodium disulphonate); Phosphosol (tetra potassium pyrophosphate); and Phosphotex (tetra sodium pyrophosphate).

The mixture of flocculate, wetting agent, and casein is then desirably subjected to the action of a high speed stirrer, and approximately 600 grams of benzene are added. As a result of the stirrer action, the benzene is intimately dispersed in the mixture, and in a comparatively few minutes the whole assumes the form of a swollen or intumescent, homogeneous heavy mass.

Water in the proportion of approximately 700 grams is then supplied to the aforementioned swollen mass and high speed stirring is again resorted to, desirably for a time interval of approximately 15 minutes. While the details of the apparatus are of no critical significance, by way of suggestion, it has been found that a container fitted with protruding flanges on the inside facilitates the stirring action.

The violent agitation and concussion of the swollen aggregates against the flanges result in the dispersion and further subdivision of the particles. It is particularly significant at this stage that microscopic examination of the material subsequently to removal of the swelling agent revealed the particles of the Thiokol to be of a size capable of, and involved in Brownian movement in the attendant aqueous medium comprising the continuous phase of the colloid. Thus, the stirring action in combination with the previous treatment results in a particle size which is definitely smaller than the particle size of the Thiokol as originally prepared.

In lieu of the above noted stirring action, the mixture may be treated in a colloid mill to obtain comparable results.

After dispersion and recovery of the swelling agent, benzene, by distillation, the aqueous dispersion is then desirably concentrated to a content of approximately 50–60% of solids; in such concentration, the dispersion comprises a liquid which definitely resembles the 60% natural latex concentrates now commercially available.

While benzene functions quite satisfactorily as the intumescent reagent and comprises a preferred embodiment of reagent, other hydrocarbon compounds may be utilized, of which ethylene dichloride and toluene are illustrative.

The casein is utilized as a protective colloid, desirably covering the discrete suspended particles as a sheath or film. In lieu thereof, substantially any hydrophilic material may be used, preferably such as are characterizable as animal or vegetable proteids. Illustrative of such materials are gelatin, glue, gum tragacanth, gum arabic, etc.

While the quantities utilized in the above example have produced quite satisfactory aqueous dispersions of elastomers, it is not intended to be restricted to the proportions disclosed. It has, however, been found that more favorable results are obtained when the dry weight of casein, based upon the weight of a flocculate comprising 60% Thiokol and 40% water ranges between 10% and 15%. On the same basis of computation, the wetting agent, such as Santomerse, may desirably approximate 5% by weight. As for the intumescing reagent, such as benzene, liberal proportions should be utilized, desirably between 100% and 200% of the Thiokol having a 40% water content, as above noted.

The resort to a flocculate having 60% Thiokol and 40% water as a basis for computation is motivated solely by convenience and not any intent to be limited thereby. That product or precipitate represents, a usual approximate analysis of the Thiokol aggregate or flocculate as prepared in accordance with the prior art procedures.

It will be clear from the disclosure as above described that the invention contemplates an expedient and effective method of obtaining stable elastomer dispersions, preferably wherein water comprises the continuous phase, which are analogous to natural latex of comparable concentration, both with respect to appearance and usage. Especially within the scope of the disclosure and constituting the preferred embodiment of the invention, are stable aqueous dispersions of Thiokol, which type of substance, as prepared exists in the form of aggregates or flocculates that settle out of the reaction solution wherein it is formed. An important element embraced by the invention is the production of dispersions wherein the particle size is smaller than that of the particle size as it normally occurs. This latter feature is particularly significant in connection with the elastomer dispersions, and especially aqueous dispersions of Thiokol, which are thereby rendered quite effective as coating compositions applicable to the dipping or spraying arts. It is likewise of interest in connection with natural latices characterized by rubber latex to improve the penetrating and covering power of such dispersions.

While the invention has been described in accordance with the preferred embodiments, it is apparent that many variations and modifications may be resorted to without departing from the scope of equivalents within the purview and spirit of this invention as defined in the following claims.

Having thus described the invention, what is claimed as new and desired to be secured by Letters Patent is:

1. The method of preparing in substantially reduced particle size an aqueous dispersion of a rubber-like reaction product of an inorganic polysulfide and an olefin dihalide from a water-containing flocculate thereof which comprises admixing with said flocculate a substantial proportion of an alkaline solution of a protective colloid and a wetting agent, adding to said mixture during vigorous mechanical agitation a reagent for swelling said polysulfide reaction product, whereby a dilated homogeneous heavy mass is obtained, adding to said mass a substantial proportion of water, subjecting the resultant mixture to vigorous mechanical agitation, and removing said swelling reagent.

2. The method of preparing in substantially reduced particle size an aqueous dispersion of a rubber-like reaction product of an inorganic polysulfide and an olefin dihalide from a water-containing flocculate thereof which comprises adding to said flocculate an alkaline casein solution and a wetting agent, subjecting said mixture to high speed agitation, adding to said mixture a substantial proportion of benzene, continuing said agitation, whereby a dilated homogeneous heavy mass is obtained, adding a substantial proportion of water to said mass, subjecting the resultant mass to high speed agitation, and removing said benzene from the mixture by distillation.

3. The method of preparing in substantially reduced particle size an improved colloidal dispersion of a water-containing elastomer flocculate of a rubber-like reaction product of an inorganic polysulfide and an olefin dihalide which comprises treating said flocculate with a substantial proportion of a protective colloid, a wetting agent, and a reagent for swelling said substance, subjecting said mixture to vigorous mechanical agitation, adding to the resultant mixture a substantial proportion of water, subjecting the latter mixture to vigorous mechanical agitation then removing said swelling reagent, and concentrating the aqueous dispersion to a content of approximately 50% to 60% of solids, whereby a colloidal dispersion is obtained having a materially improved penetrating and covering power and manifesting a high rate of Brownian movement.

4. The method of preparing in substantially reduced particle size an aqueous dispersion of a rubber-like reaction product of an inorganic polysulfide and an olefin dihalide from a flocculate thereof which comprises admixing with said flocculate, containing approximately 60% of the organic polysulfide and approximately 40% water, an alkaline solution containing between approximately 10% and 15% of casein by weight of flocculate, adding to said mixture a comparatively small quantity of a wetting agent, adding benzene to the mixture in quantity approximating 1⅔ that of the flocculate, during high speed mechanical agitation to facilitate swelling of the mass, the adding water in quantity approximately twice that of the flocculate and continuing the high speed agitation of the mixture, removing said benzene from the mixture by distillation, and concentrating the aqueous dispersion to a content of approximately 50% to 60% of solids.

5. The method as in claim 1 wherein the vigorous mechanical agitation is attained by treatment in a colloid mill.

JOHN EDWARDES.

REFERENCES CITED

The following references are of record in the file of this patent:

UNITED STATES PATENTS

| Number | Name | Date |
|---|---|---|
| 1,793,983 | Whittelsey | Feb. 24, 1931 |
| 1,980,589 | Acree | Nov. 13, 1934 |
| 2,296,427 | Daniel et al. | Sept. 22, 1942 |
| 2,313,144 | Gomm | Mar. 9, 1943 |
| 2,194,958 | Szegvari et al. | Mar. 26, 1940 |
| 2,097,212 | Healy | Oct. 26, 1937 |

OTHER REFERENCES

Stevens: Institute of the Rubber Industry Trans., vol. 18, June 1942, page 20.

Meyer: Natural and Synthetic High Polymers Interscience, 1942, pages 51 to 53, 147 and 148. (Copy in Div. 50.)

Dinsmore: Chemical & Eng. News, Nov. 10, 1943, pages 1798 to 1801. (Copy Div. 50.)

Fisher (1) Industrial & Eng. Chem., vol. 31, Aug. 1939, pages 941 to 945.

Fisher (2) Chemical & Eng. News, vol. 21, May 25, 1943, page 745.

Kruyt: Colloids, Wiley, 1937, pages 139 to 140. (Copy in Div. 43.)